US011767038B2

(12) United States Patent
Iglesias

(10) Patent No.: US 11,767,038 B2
(45) Date of Patent: *Sep. 26, 2023

(54) DETECTING POTENTIALLY OCCLUDED OBJECTS FOR AUTONOMOUS VEHICLES

(71) Applicant: Waymo LLC, Mountain View, CA (US)

(72) Inventor: Jennifer Iglesias, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,375

(22) Filed: May 2, 2022

(65) Prior Publication Data

US 2022/0262133 A1 Aug. 18, 2022

Related U.S. Application Data

(63) Continuation of application No. 16/552,426, filed on Aug. 27, 2019, now Pat. No. 11,354,912.

(51) Int. Cl.
*B60W 60/00* (2020.01)
*G05D 1/02* (2020.01)
(Continued)

(52) U.S. Cl.
CPC ...... *B60W 60/0027* (2020.02); *B60W 30/146* (2013.01); *B60W 50/0097* (2013.01);
(Continued)

(58) Field of Classification Search
CPC ......... B60W 60/0027; B60W 60/0017; B60W 30/146; B60W 50/0097; B60W 2554/00;
(Continued)

(56) References Cited

U.S. PATENT DOCUMENTS 9,440,647 B1 9/2016 Sucan et al.
11,126,180 B1 9/2021 Kobilarov
(Continued)

FOREIGN PATENT DOCUMENTS

JP 2011145204 A 7/2011
JP 2013086782 A 5/2013
KR 20170006483 A 1/2017

OTHER PUBLICATIONS

Thornton et al.; Autonomous Vehicle Speed Control for Safe Navigation of Occluded Pedestrian Crosswalk; arXiv:1802.06314 (2018); p. 1-6 (Year: 2018).*

(Continued)

*Primary Examiner* — Michael J Zanelli
(74) *Attorney, Agent, or Firm* — Botos Churchill IP Law

(57) ABSTRACT

Aspects of the disclosure relate to controlling a vehicle having an autonomous driving mode. For instance, that the vehicle is approaching a crosswalk may be determined. A set of segments may be identified for the crosswalk. A set of potential occluded pedestrians may be generated. Each potential occluded pedestrian of the set is assigned a speed characteristic and a segment. The segments of the set of potential occluded pedestrians may be updated over time using the assigned speed characteristics. Sensor data from a perception system of the vehicle is received, and one or more potential occluded pedestrians an having an updated assigned segment corresponding to a segment that is visible to a perception system of the vehicle may be removed from the set of potential occluded pedestrians. After the removing, the set may be used to control the vehicle in the autonomous driving mode.

20 Claims, 10 Drawing Sheets

(51) Int. Cl.
    *B60W 30/14*     (2006.01)
    *G05D 1/00*     (2006.01)
    *B60W 50/00*     (2006.01)
    *G06V 20/58*     (2022.01)
    *G06V 40/10*     (2022.01)
    *G06V 10/26*     (2022.01)

(52) U.S. Cl.
    CPC ......... *G05D 1/0088* (2013.01); *G05D 1/0223* (2013.01); *G06V 10/273* (2022.01); *G06V 20/58* (2022.01); *G06V 40/103* (2022.01); *B60W 2554/00* (2020.02)

(58) Field of Classification Search
    CPC ...... B60W 2554/4029; B60W 2552/53; G05D 1/0088; G05D 1/0223; G06V 10/273; G06V 20/58; G06V 40/103
    See application file for complete search history.

(56) References Cited

U.S. PATENT DOCUMENTS

| | | |
|---|---|---|
| 2011/0246156 A1 | 10/2011 | Zecha et al. |
| 2016/0327953 A1 | 11/2016 | Nilsson et al. |
| 2017/0259753 A1 | 9/2017 | Meyhofer et al. |
| 2017/0329332 A1 | 11/2017 | Pilarski et al. |
| 2019/0025433 A1 | 1/2019 | Yang et al. |
| 2019/0146519 A1 | 5/2019 | Miura et al. |
| 2019/0232957 A1 | 8/2019 | Frazzoli et al. |
| 2019/0286921 A1 | 9/2019 | Liang et al. |
| 2020/0278681 A1 | 9/2020 | Gier et al. |
| 2020/0310425 A1 | 10/2020 | Ghose et al. |

OTHER PUBLICATIONS

Thornton et al.; Value Sensitive Design for Autonomous Vehicle Motion Planning; 2018 IEEE Intelligent Vehicles Symposium (IV) Changshu, Suzhou, China, Jun. 26-30, 2018; pp. 1157-1162 (Year: 2018).*

Schratter et al.; Pedestrian Collision Avoidance System for Scenarios with Occlusions; 2019 IEEE Intelligent Vehicles Symposium (IV) Paris, France. Jun. 9-12, 2019; pp. 1054-1060 (Year: 2019).*

A. Howard, L. H. Matthies, A. Huertas, M. Bajracharya and A. Rankin, Detecting Pedestrians with Stereo Vision: Safe Operation of Autonomous Ground Vehicles in Dynamic Environments, pp. 1-12, Pasadena, CA.

International Search Report and Written Opinion for Application No. PCT/US2020/047771 dated Dec. 4, 2020.

The Extended European Search Report for European Patent Application No. 20857388.1, dated Jul. 3, 2023, 8 Pages.

* cited by examiner

DETECTING POTENTIALLY OCCLUDED OBJECTS FOR AUTONOMOUS VEHICLES

CROSS REFERENCE TO RELATED APPLICATIONS

The present application is a continuation of U.S. patent application Ser. No. 16/552,426, filed Aug. 27, 2019, the entire disclosure of which is incorporated herein by reference.

BACKGROUND

Autonomous vehicles, such as vehicles which do not require a human driver when operating in an autonomous driving mode, may be used to aid in the transport of passengers or items from one location to another. Autonomous vehicles, such as vehicles which do not require a human driver, may be used to aid in the transport of passengers or items from one location to another. An important component of an autonomous vehicle is the perception system, which allows the vehicle to perceive and interpret its surroundings using various sensors such as cameras, radar, lasers, and other similar devices. For example, autonomous vehicles may use the sensors to gather and interpret images and sensor data about its surrounding environment, e.g., parked cars, trees, buildings, etc. Information from the perception system may be used by these vehicles to make numerous decisions while the autonomous vehicle is in motion, such as speeding up, slowing down, stopping, turning, etc.

Information from the perception system may also be combined with highly detailed map information in order to allow a vehicle's computer to safely maneuver the vehicle in various environments. This map information may describe expected conditions of the vehicle's environment such as the shape and location of roads, traffic signals, and other objects. In this regard, the information from the perception system and detailed map information may be used to assist a vehicle's computer in making driving decisions involving how to maneuver the vehicle to avoid other objects in the roadway while obeying traffic laws. This may be especially difficult where some objects in the roadway are occluded by other objects.

Aspects of the disclosure provide a method of controlling a vehicle having an autonomous driving mode. The method includes determining, by one or more processors, that the vehicle is approaching a crosswalk; identifying, by the one or more processors, a set of segments for the crosswalk; generating, by the one or more processors, a set of potential occluded pedestrians, each potential occluded pedestrian of the set being assigned a speed characteristic defining a speed of the potential occluded pedestrian and an assigned segment of the set of potential occluded pedestrians; updating the assigned segments of the set of potential occluded pedestrians over time using the assigned speed characteristics; receiving, by the one or more processors, sensor data from a perception system of the vehicle; identifying, by the one or more processors, a segment of the set of segments that is visible to the perception system based on the sensor data; removing, by the one or more processors, one or more potential occluded pedestrians having an updated assigned segment corresponding to the identified segment from the set of potential occluded pedestrians; and after the removing, using, by the one or more processors, the set to control the vehicle in the autonomous driving mode.

In one example, determining that the vehicle is approaching a crosswalk is based on a current route of the vehicle and map information identifying a location of the crosswalk. In another example, the generating is performed when the vehicle has reached a predetermined distance. In this example, the predetermined distance corresponds to a distance from the crosswalk along a current route of the vehicle. Alternatively, the predetermined distance corresponds to a forward edge of a field of view of a perception system of the vehicle including one or more sensors. In another example, identifying the segments includes segmenting an area of the crosswalk into a predetermined number of segments. In another example, identifying the segments includes retrieving the segments from pre-stored map information. In another example, generating the set of potential occluded pedestrians includes associating each segment with a plurality of pedestrians having different speed characteristics. In this example, one of the different speed characteristics indicates that a pedestrian is stationary. In addition or alternatively, one of the different speed characteristics includes a pedestrian moving in a first direction towards a first edge of the crosswalk at a first speed, and wherein another of the different speed characteristics includes a pedestrian moving in a second direction opposite of the first direction towards a second edge of the crosswalk opposite of the first edge at the first speed. In another example, the one or more potential occluded pedestrians are removed from the set based on a determination that the one or more potential occluded pedestrians would have left the crosswalk. In another example, the one or more potential occluded pedestrians are removed from the set is also based on whether an area corresponding to a current segment for that one or more potential occluded pedestrians has been visible to the perception system for a minimum number of iterations of received sensor data while the one or more potential occluded pedestrians would have occupied the current segment. In another example, the one or more potential occluded pedestrians are removed from the set is also based on whether an area corresponding to a current segment for that one or more potential occluded pedestrians has been visible to the perception system for at least a predetermined period of time during which the one or more potential occluded pedestrians would have occupied the current segment. In another example, the one or more potential occluded pedestrians are removed from the set is also based on whether a current segment for that one or more potential occluded pedestrians has been occupied by a non-pedestrian object for a minimum number of iterations of received sensor data while the one or more potential occluded pedestrians would have occupied the current segment. In another example, using the set of potential occluded pedestrians to control the vehicle in the autonomous driving mode includes, generating a speed constraint based on the set of potential occluded pedestrians, the speed constraint which limits the speed of the vehicle based on a distance of the vehicle from the crosswalk to ensure that the vehicle is able to stop before reaching the crosswalk. In another example, the method also includes determining whether one or more edges of the crosswalk are occluded and adding one or more additional potential occluded pedestrians to the set of potential occluded pedestrians based on the determination of whether one or more edges of the crosswalk are occluded, and wherein the removing is performed after the adding. In this example, wherein when the one or more edges of the crosswalk are not occluded, the one or more additional potential occluded pedestrians are not added to the set. In addition or alternatively, each of the one or more additional potential occluded pedestrians is assigned a speed characteristic. In another example, wherein using the set of potential occluded pedestrians to control the vehicle in the autonomous driving mode includes generating a speed constraint based on the set of potential occluded pedestrians, the speed constraint identifies a maximum speed limit for the vehicle when approaching the crosswalk. In this example, the speed constraint is a slow region and is generated based on a distance between one of the set of potential occluded pedestrians and the vehicle as well as the assigned speed characteristic for the one of the set of potential occluded pedestrians.

DETAILED DESCRIPTION

Overview

Figure 1:
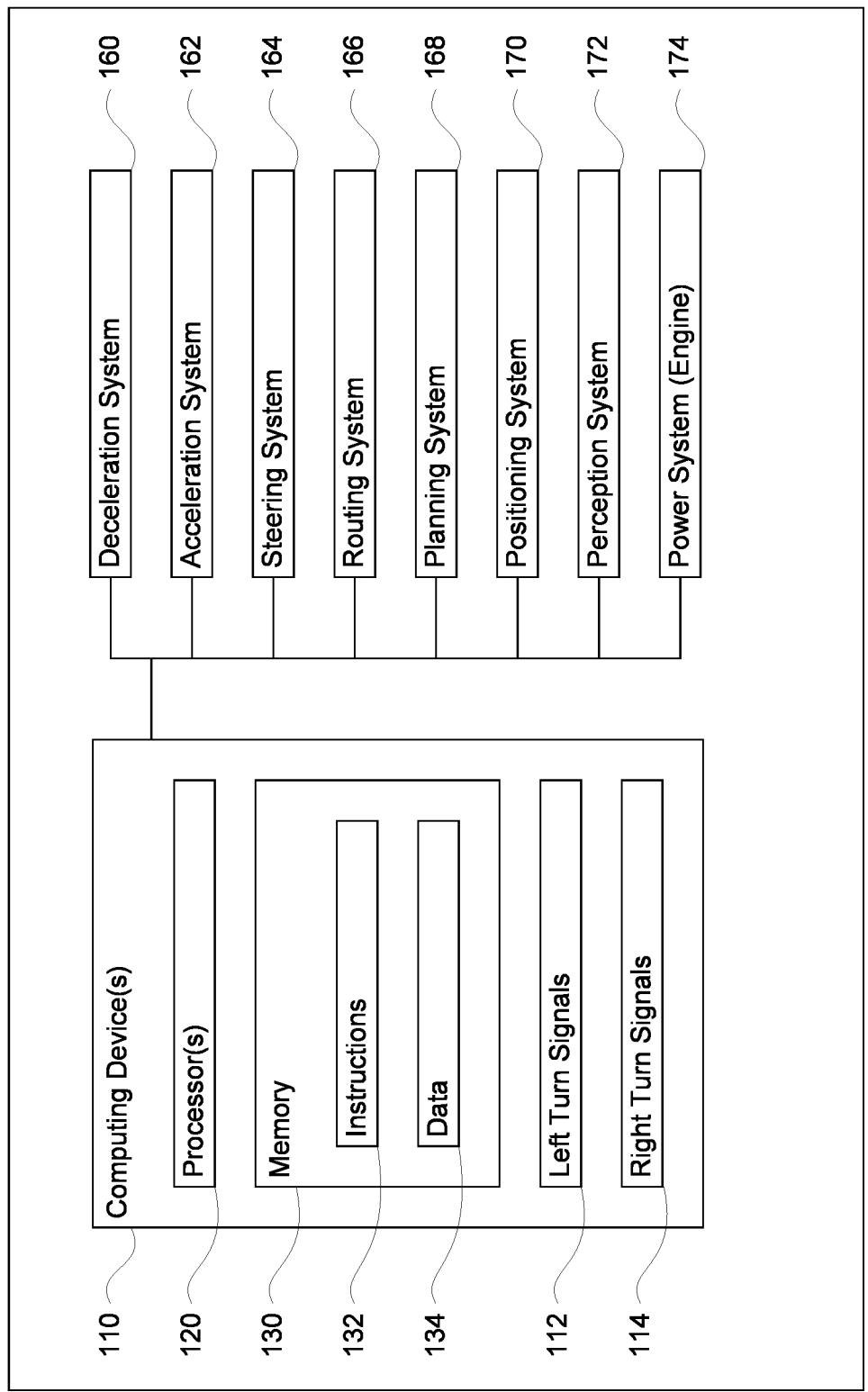
FIG. 1 is a functional diagram of an example vehicle in accordance with an exemplary embodiment.

The technology relates to detecting potentially occluded objects, and particularly those that may be located within or proximate to a crosswalk. For example, autonomous vehicles may travel on roadways which include crosswalks. In many examples, various objects such as moving or parked vehicles or trees may cause parts of the crosswalk to be occluded, or not directly visible to the autonomous vehicle's sensors. Because of this, the autonomous vehicle's computers may estimate whether a segment of a crosswalk could be occupied by an occluded object and may use this to control the vehicle.

As a vehicle drives around, it may at times approach and eventually crossover crosswalks. These crosswalks may be known apriori, that is, prestored in map information accessible by the vehicle's computing devices. In this regard, the vehicle's computing devices may determine that the vehicle is approaching a crosswalk. In other words, this determination may be made before perception system is actually able to perceive the crosswalk.

Once the computing devices determine that the vehicle is approaching a particular crosswalk, the computing devices may determine a plurality of segments for that crosswalk. These segments may be pre-stored, for instance in the map information, and associated with the particular crosswalk. Alternatively, the computing devices may generate the plurality of segments in real time.

A set of potential occluded pedestrians may be generated for each segment. These potential occluded pedestrians for each segment may be given a different speed characteristic. This speed characteristic can include information such as the potential velocity and heading of the occluded pedestrian. In some more complicated examples, the speed characteristic for a potential occluded pedestrian may include a pattern of changing speeds or accelerations.

Overtime, with the exception of the stationary pedestrian, the pedestrians of the set will move into different segments of the crosswalk and in some cases may actually exit the crosswalk. Thus, the computing devices may update the segments or the location of each potential occluded pedestrian of the set as time progresses forward.

As time progresses forward, the vehicle's perception system may provide sensor data to the computing devices. The sensor data may identify objects such as pedestrians, bicyclists, and vehicles in and around the crosswalk and various other locations. In addition, the sensor data may allow the computing devices to identify which areas of the vehicle's environment are unoccupied or not occluded.

The computing devices may use this sensor data to determine whether any of the potential occluded pedestrians of the set for each segment could not actually exist or rather, should be discarded or removed from the set. For instance, if a segment has been visible (or perceived by) for a minimum number of iterations or period of time and not occupied by a detected pedestrian, any potential occluded pedestrians which have been tracked (i.e. updated) to that segment may be removed from the set. In some instances, potential occluded pedestrians may be removed from the sets because they may have left the crosswalk, for instance, by crossing one of the outer edges of the edge segments of the crosswalk. Similarly, if the area around the edge of the crosswalk is occluded, new potential occluded pedestrians may be added to the sets as potential occluded pedestrians who have entered the crosswalks. Again, these pedestrians that enter the crosswalk may be given different speed characteristics as described above. Of course, if the outer edges of the crosswalk are not occluded new potential occluded pedestrians would not be added to the set.

As the segments become visible and potentially even occluded by objects, the number of potential occluded pedestrians in the set may change, for instance, increasing as potential occluded pedestrians are added and decreasing as potential occluded pedestrians are removed. At the same time, after determining that the vehicle is approaching the crosswalk, the computing devices may also determine how to control the vehicle using the potential occluded pedestrians of the set. Alternatively, rather than having the computing devices respond to a large number of potential occluded pedestrians, for each segment which is "occupied" by at least one potential occluded pedestrian, the computing devices may generate a speed constraint for the vehicle passing through the crosswalk. The speed constraint may be determined based on the distance of an occupied segment to the vehicle as well as the speed of potential occluded pedestrians in the occupied segment. The planning system may then use the speed constraint when generating a speed plan for a future trajectory of the vehicle.

The features described herein may enable the vehicle's computing devices to respond to potential occluded pedestrians who may be occluded while at the same time reducing the likelihood and necessity for abrupt maneuvers in the event that a pedestrian who was previously occluded appears and causes the vehicle to have to respond to that pedestrian. In addition, the processing described herein is not computationally intensive and can be easily recomputed when updates from sensor data are available.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

In one aspect the computing devices 110 may be part of an autonomous control system capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 132 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle.

Planning system 168 may be used by computing devices 110 in order to determine and follow a route generated by a routing system 166 to a location. For instance, the routing system 166 may use map information to determine a route from a current location of the vehicle to a drop off location. The planning system 168 may periodically generate trajectories, or short-term plans for controlling the vehicle for some period of time into the future, in order to follow the route (a current route of the vehicle) to the destination. In this regard, the planning system 168, routing system 166, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
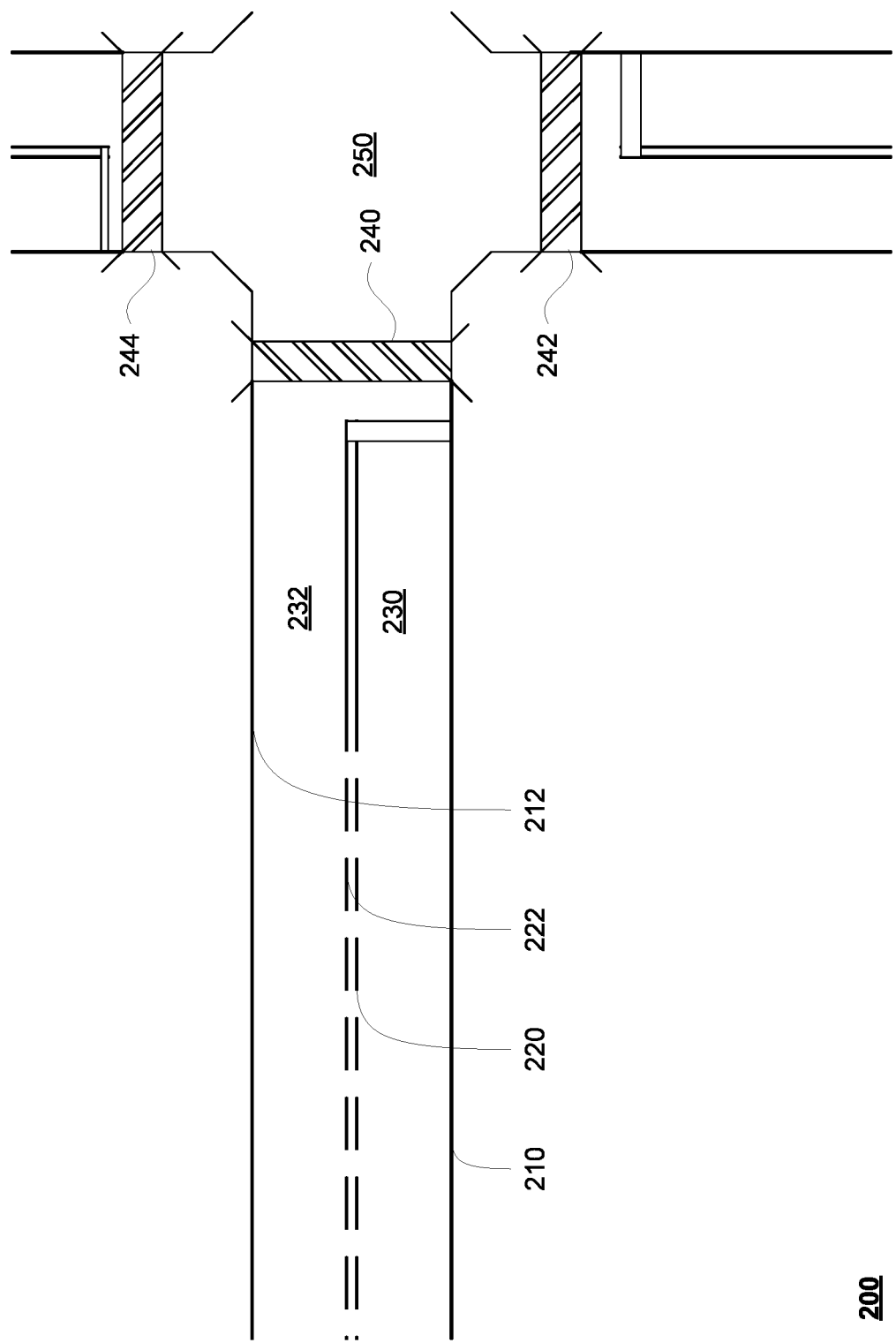
FIG. 2 is an example of map information in accordance with aspects of the disclosure.

FIG. 2 is a high-level example of map information 200 for a roadway including an intersection. In this example, the map information 200 includes a plurality of different features that identify the shape and location of various features such as curbs or fog lines 210, 212, lane lines 220, 222, lanes 230, 232, crosswalks 240, 242, 244, and intersection 250. The map information 200 may be a part of the detailed maps described above and used by the various computing devices of vehicle 100 in order to maneuver the vehicle 100. In this regard, the map information may include significantly more detail than highlighted here.

Although the map information is depicted herein as an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with the computing devices of the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
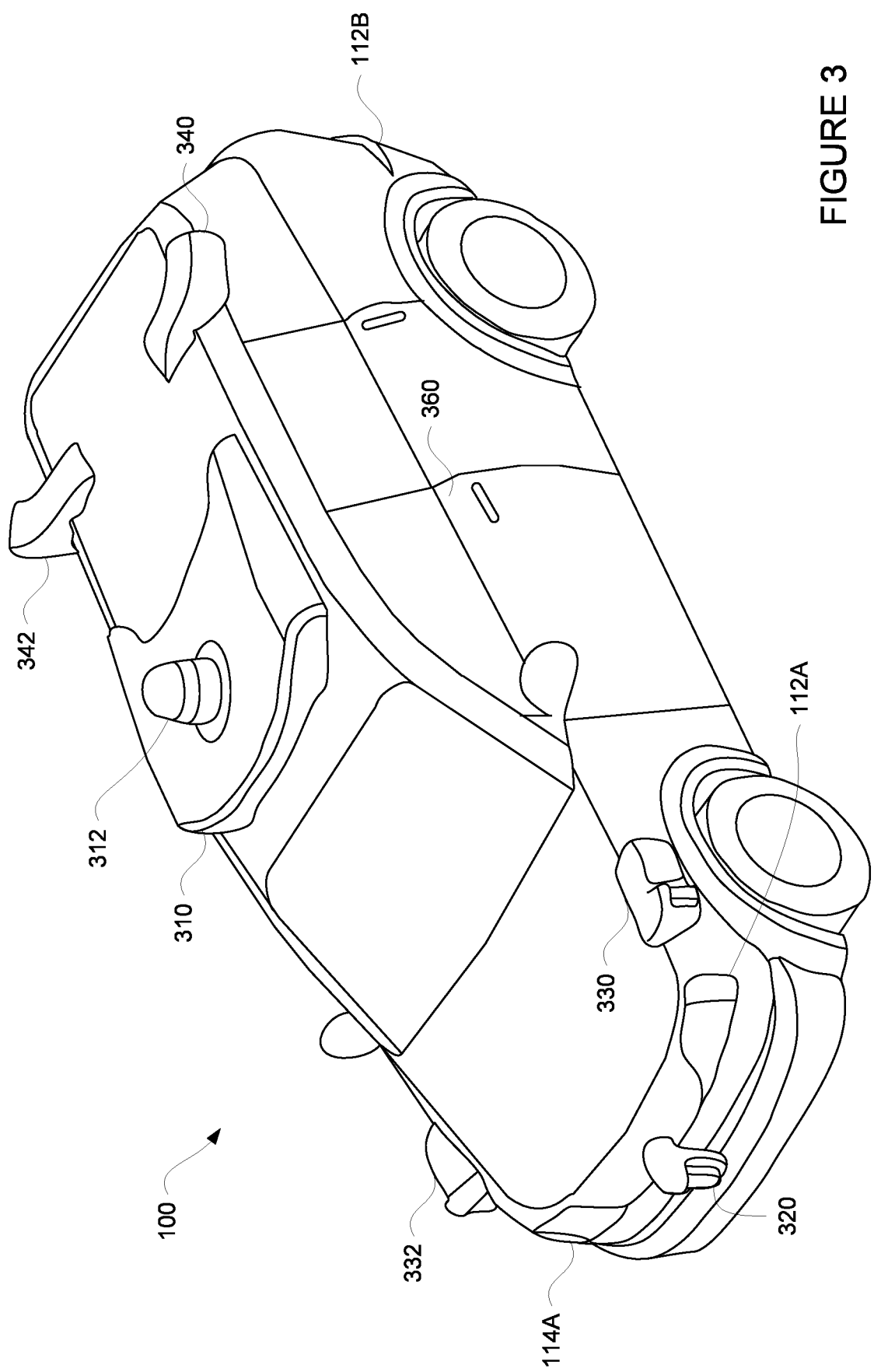
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. FIG. 3 also depicts left and right turn signals 112, 114. In this example, front left turn signal 112A, rear left turn signal 112B, and front right turn signal 114A are depicted, but a right rear turn signal is not visible (or not perceived) from the perspective of FIG. 3.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 168, positioning system 170, perception system 172, and power system 174 (i.e. the vehicle's engine or motor) in order to control the movement, speed, etc. of vehicle 100 in accordance with the instructions 132 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planning system software module of the planning system 168. The planning system may use this input to generate trajectories for the vehicle to follow for some brief period of time into the future based on a current route of the vehicle generated by a routing module of the routing system 166. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals 112 or 114 of the signaling system). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
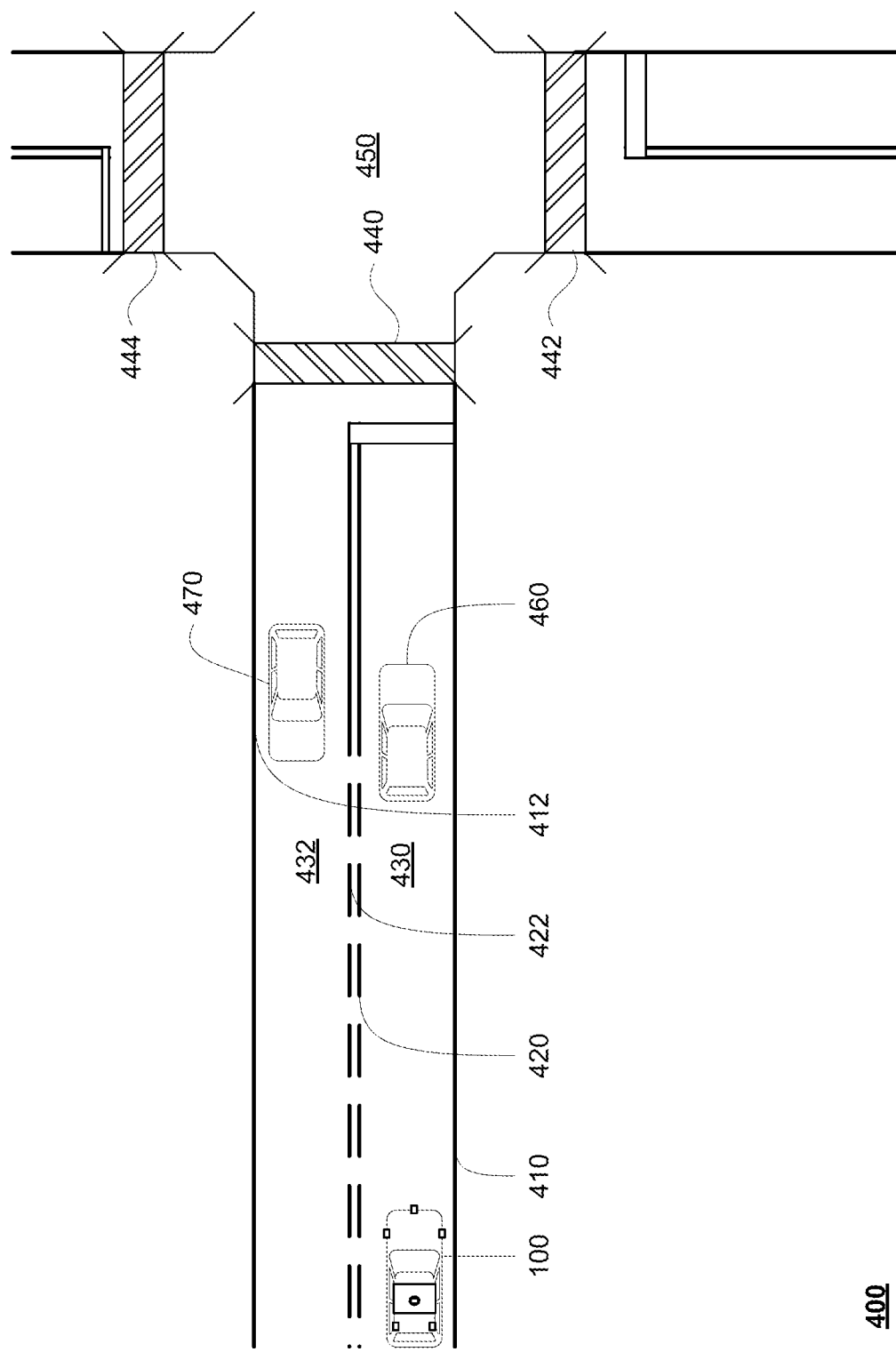
FIG. 4 is an example of a section of roadway corresponding to the map information of FIG. 2 in accordance with aspects of the disclosure.

For the purposes of demonstration, FIG. 4 is an example representation of a section of roadway 400 corresponding to the map information 200. In this regard, the shapes and locations of curbs or fog lines 410, 412, lane lines 420, 422, lanes 430, 432, crosswalks 440, 442, 444, and intersection 450 may correspond to the shapes and locations of curbs or fog lines 210, 212, lane lines 220, 222, lanes 230, 232, crosswalks 240, 242, 244, and intersection 250, respectively. In this example, vehicle 100 is approaching the crosswalk 440 in lane 430. In addition, the sensors of the perception system 172 may also perceive vehicles 460 (also approaching crosswalk 440 in lane 430) and vehicle 470 (moving away from crosswalk 440 in lane 432). These vehicles 460, 470 may prevent the sensors of the perception system 172 from perceiving all of the areas of crosswalk 440.

Figure 10:
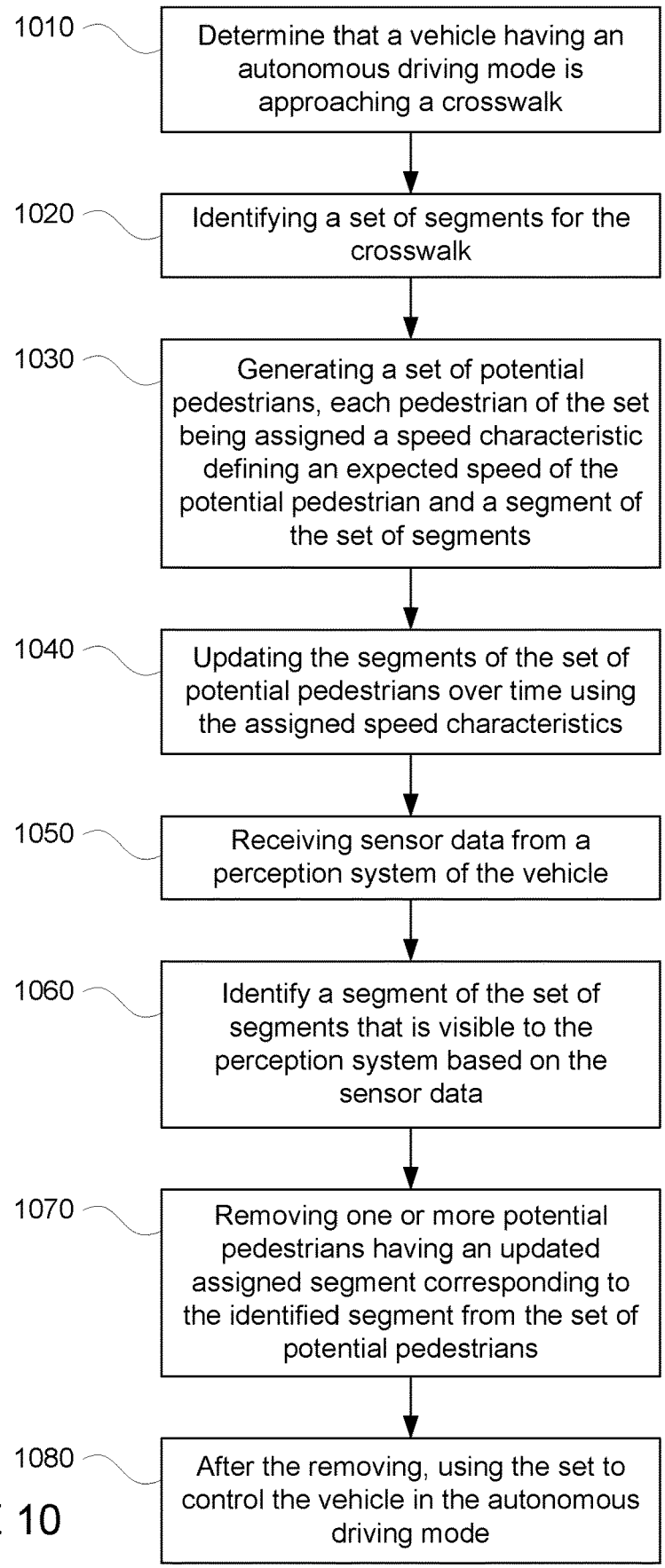
FIG. 10 is an example flow diagram in accordance with aspects of the disclosure.

FIG. 10 is an example flow diagram 1000 in accordance with aspects of the disclosure which may be performed by one or more processors of one or more computing devices, such as processors 120 of computing devices 110, in order to maneuver a vehicle having an autonomous driving mode. As shown in block 1010, a vehicle having an autonomous driving mode is determined to be approaching a crosswalk. For instance, as a vehicle drives around, it may at times approach and eventually crossover crosswalks. For example, computing devices 110 may use the map information 200 to determine that the vehicle 100 is approaching the crosswalk 440 or the perception system 172 may actually detect the crosswalk 440 using the aforementioned sensors. The timing of this determination may correspond to when the perception system 172 initially detects the crosswalk or when the vehicle is located a predetermined distance (e.g. linear or driving distance) such as 170 meters or more or less from the crosswalk 440 along a current route of the vehicle (i.e. that the vehicle is currently traveling), for instance, through intersection 450. In some examples this predetermined distance may correspond to a forward edge of or just beyond a field of view of the vehicle's perception system. In other words, this determination may be made before perception system is actually able to perceive the crosswalk.

Figure 5:
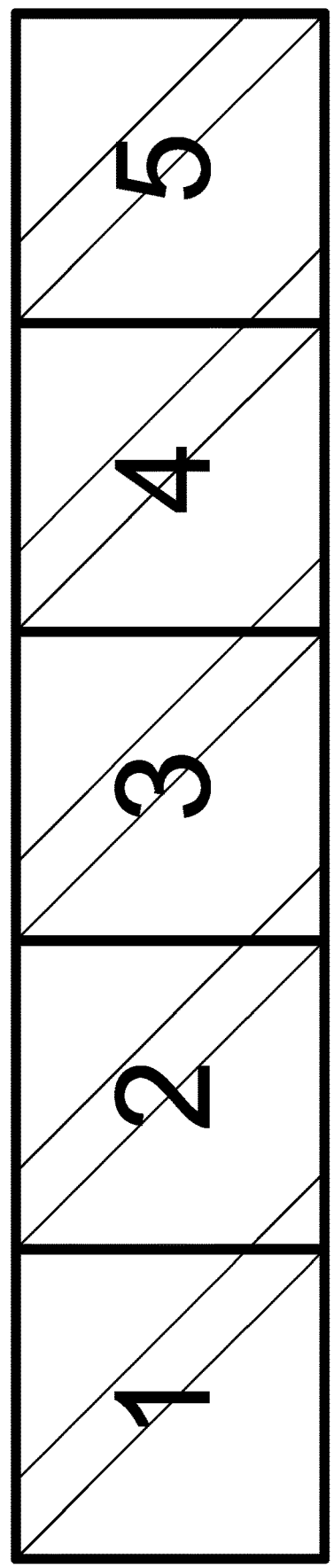
FIG. 5 is an example representation of a plurality of segments for a sidewalk in accordance with aspects of the disclosure.

Returning to FIG. 10, a set of segments is identified for the crosswalk at block 1020. Once the computing devices determine that the vehicle is approaching a particular crosswalk, the computing devices may determine a plurality of segments for that crosswalk. These segments may be pre-stored, for instance in the map information, and associated with the particular crosswalk. Alternatively, the computing devices may generate the plurality of segments in real time. As an example, a crosswalk may be segmented into a predetermined number of segments, such as 5 segments or more or less, along the length of the crosswalk. In this regard, the crosswalk may include 3 internal segments and 2 edge segments corresponding to the ends of the crosswalk. Alternatively, a crosswalk may be segmented into segments of a predetermined length such as 3 meters or more or less. FIG. 5 is an example representation of a plurality of segments 1-5 for crosswalk 440. In this example, the crosswalk 440 is divided into 5 equal segments. Again, this is only an example, and more segments of different shapes and/or sizes may be used.

Returning to FIG. 10, at block 1030, a set of potential occluded pedestrians is generated, and each potential occluded pedestrian of the set is assigned a speed characteristic defining a speed of the potential occluded pedestrian and assigned a segment of the set of segments. For instance, a set of potential occluded pedestrians may be generated for each segment 1-5 of the crosswalk 440. As an example, a list or other set of data may be generated representing each pedestrian of the set of pedestrians as well as a segment in which the pedestrian is currently located.

These potential occluded pedestrians for each segment may be assigned or otherwise be associated with a different speed characteristic. This speed characteristic can include information such as the potential speed and heading of the potential occluded pedestrian. As an example, the speed could be an average or estimated speed of a typical pedestrian walking slowly, "speed walking", jogging, running, etc. In some more complicated examples, the speed characteristic for a potential occluded pedestrian may include a pattern of changing speeds or accelerations. Although the examples herein relate specifically to "pedestrians" the set of potential occluded pedestrians may actually be representative of all types of potentially occluded objects in a crosswalk such as bicyclists, adults, children, pets (dogs, horses, etc.), baby carriages or strollers, etc. with various speed characteristics.

As one representative example, if there are 11 potential occluded pedestrians for each segment, and there are 5 segments, there may be 55 potential occluded pedestrians in the set. Referring to a single segment, one potential occluded pedestrian may be stopped, another potential occluded pedestrian may be moving 1 mph towards a first edge of the crosswalk, another potential occluded pedestrian may be moving 2 mph towards the first edge of the crosswalk, another potential occluded pedestrian may be moving 3 mph towards the first edge of the crosswalk, another potential occluded pedestrian may be moving 6 mph towards the first edge of the crosswalk, another potential occluded pedestrian may be moving 12 mph towards the first edge of the crosswalk, another potential occluded pedestrian may be moving 1 mph towards a second edge of the crosswalk, another potential occluded pedestrian may be moving 2 mph towards the second edge of the crosswalk, another potential occluded pedestrian may be moving 3 mph towards the second edge of the crosswalk, another potential occluded pedestrian may be moving 6 mph towards the second edge of the crosswalk, and another potential occluded pedestrian may be moving 12 mph towards the second edge of the crosswalk. These edges may be opposite of one another. Other speed characteristics (such as those discussed above) and numbers of pedestrians may also be possible.

Figure 6:
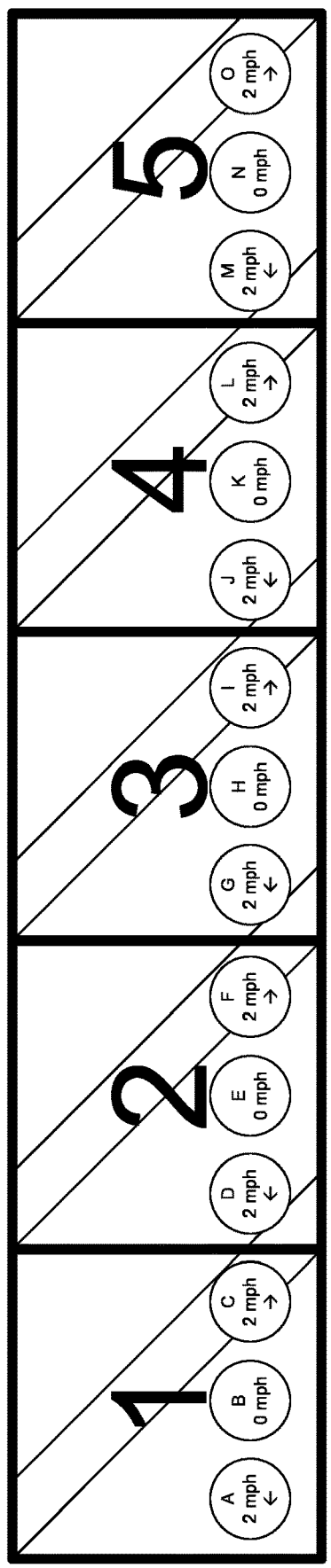
FIG. 6 is an example representation of a plurality of segments for a sidewalk and a set of potential occluded pedestrians in accordance with aspects of the disclosure.

FIG. 6 is an example representation of segments 1-5 each and a set of potential occluded pedestrians A-O. In this example, each of the segments 1-5 is associated with three potential occluded pedestrians: one potential occluded pedestrian having a speed of 2 miles per hour to an edge of the crosswalk at the left side of the page (potential occluded pedestrians A, D, G, J, and M), one potential occluded pedestrian who is stationary (potential occluded pedestrians B, E, H, K, and N, moving at 0 mph), and one potential occluded pedestrian having a speed of 2 miles per hour to an edge of the crosswalk at the right side of the page (potential occluded pedestrians C, F, I, L, and O. Again, as noted above, additional potential occluded pedestrians with different speeds or other speed characteristics may also be possible. In this example, potential occluded pedestrians A-C are located in segment 1, potential occluded pedestrians D-F are located in segment 2, potential occluded pedestrians G-I are located in segment 3, potential occluded pedestrians J-L are located in segment 4, and potential occluded pedestrians M are located in segment 5.

Returning to FIG. 10, at block 1040, the assigned segments of the set of potential occluded pedestrians may be updated over time based on the assigned speed characteristics. In other words, as time progresses forward, with the exception of the stationary pedestrian, the pedestrians of the set will move into different segments of the crosswalk and in some cases may actually exit the crosswalk. Thus, the computing devices may update the segment or the location of each potential occluded pedestrian of the set as time progresses forward. These updates may be periodic, for instance, every 0.1 seconds or more or less, in order to keep the assigned segments consistent with where the potential occluded pedestrians would be at the current time. The period for updating may also be commensurate with or dictated by how often sensor data is generated by the perception system and/or received by the computing devices 100. For instance, if updated sensor data is received every 0.1 seconds or more or less, the assigned segments may be updated every 0.1 seconds or more or less. In this way, the assigned segments and the sensor data being analyzed by the computing devices 110 are both time synchronized. Alternatively, as sensor data is received, the assigned segments may be updated to the time for or at which the sensor data was generated.

Figure 7:
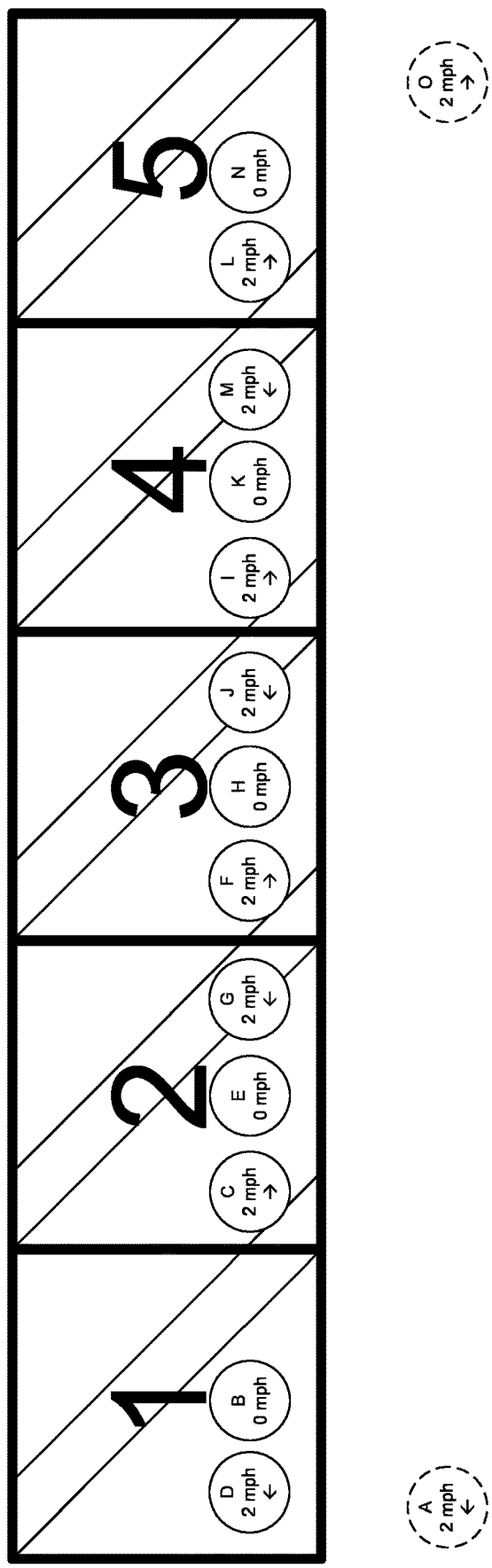
FIG. 7 is an example representation of a plurality of segments for a sidewalk and set of potential occluded pedestrians in accordance with aspects of the disclosure.

FIG. 7 is an example representation of segments 1-5 each and a set of potential occluded pedestrians A-O at some point in the future with respect to the example of FIG. 6. In this example, potential occluded pedestrians D, G, J, and M have moved one segment to the left of the page, and potential occluded pedestrian A is not in any of the segments 1-5 or rather, is no longer located within a segment in the crosswalk. As such, potential occluded pedestrian A is shown in dashed-line. Potential occluded pedestrians C, F, I, and L have moved one segment to the left of the page, and potential occluded pedestrian O is not in any of the segments 1-5 or rather, is no longer located within a segment in the crosswalk. As such, potential occluded pedestrian O is shown in dashed-line. Potential occluded pedestrians B, E, H, K, and N remain in each of segments 1-5, respectively.

Returning to FIG. 10, at block 1050, sensor data is received from a perception system of the vehicle, and at block 1060, a segment of the set of segments that is visible to the perception system is identified based on the sensor data. As time progresses forward, the perception system 172 may provide sensor data to the computing devices 110. As noted above, this sensor data may be received every 0.1 seconds or more or less and may be commensurate with the updates to the assigned segments. Each time the sensor data is received may be considered a new iteration of sensor data from the perception system. The sensor data may identify objects such as pedestrians, bicyclists, and vehicles in and around the crosswalk and various other locations. In addition, the sensor data may allow the computing devices to identify which areas of the vehicle's environment are unoccupied or not occluded, including areas corresponding to the segments of the set of segments.

At block 1070 of FIG. 10, one or more potential occluded pedestrians having an updated assigned segment corresponding to the identified segment is removed from the set of potential occluded pedestrians. The computing devices 110 may use this sensor data to determine whether any of the potential occluded pedestrians of the set for each segment could not actually exist or rather, should be discarded, filtered or otherwise removed from the set. For instance, if a segment has been visible for a minimum number of iterations or period of time and not occupied by a detected pedestrian, any potential occluded pedestrians which have been tracked (i.e. updated) to that segment may be removed from the set. As an example, this minimum number of iterations may be at least 5 (or more or less) iterations of sensor data from the perception system. As another example, the minimum number of iterations may be at least 0.5 seconds or more or less. If a section of the crosswalk has been occupied by an object other than a pedestrian (e.g. a non-pedestrian object) for a minimum number of iterations, for example more than 3 (or more or less) iterations of sensor data received from the perception system, or a minimum period of time, for example, for at least 0.3 seconds or more or less, any potential occluded pedestrians which have been tracked (i.e. updated) to that segment may be removed from the set.

Figure 8:
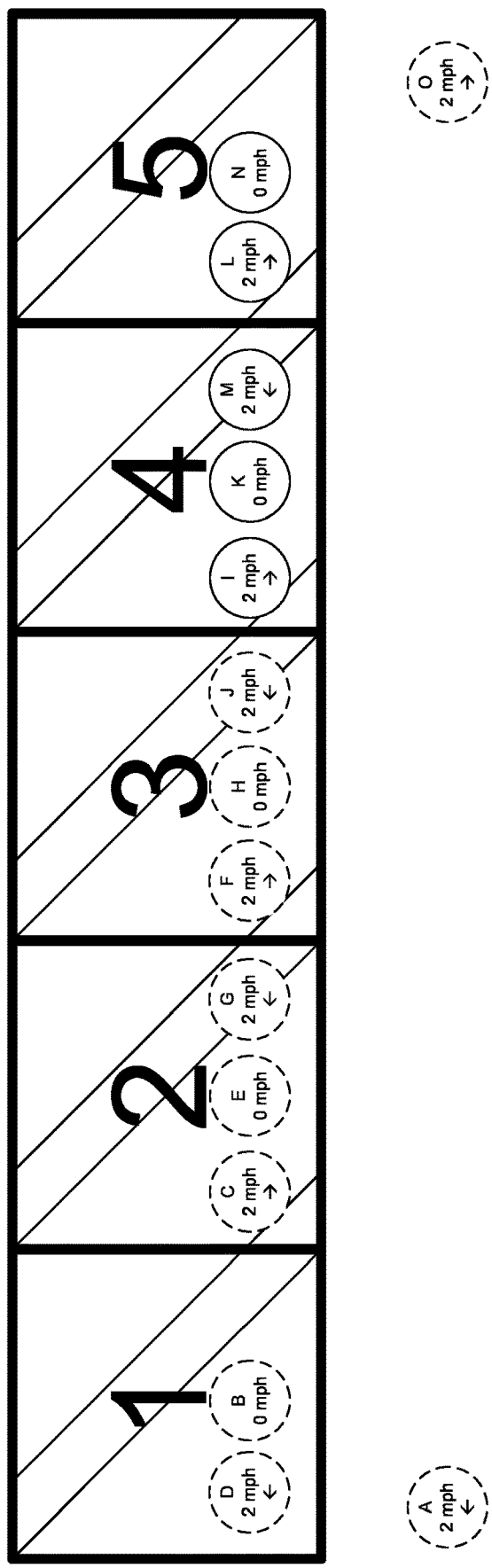
FIG. 8 is an example representation of a plurality of segments for a sidewalk and set of potential occluded pedestrians in accordance with aspects of the disclosure.
Figure 9:
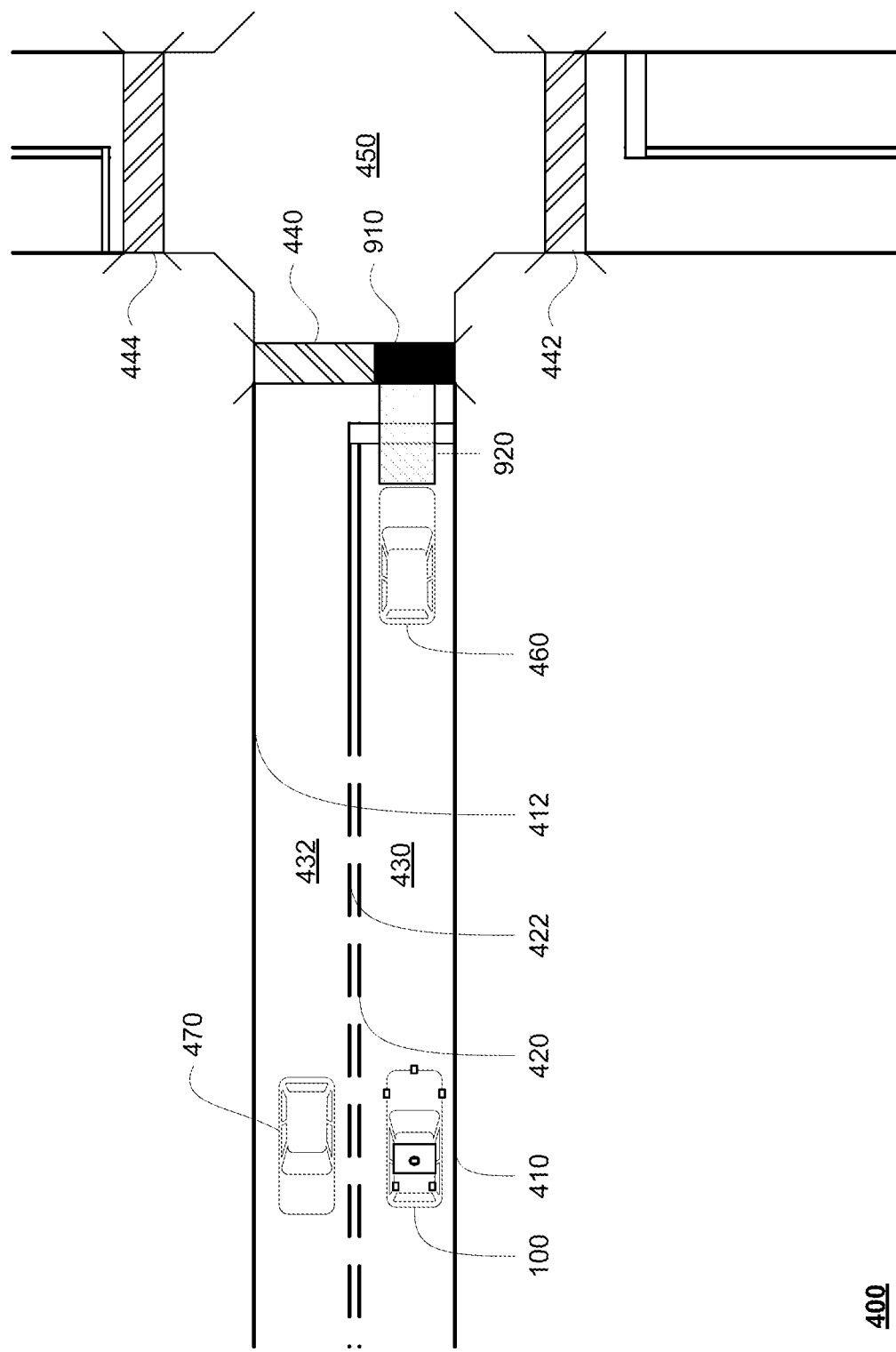
FIG. 9 is an example representation of a plurality of segments for a sidewalk and set of potential occluded pedestrians in accordance with aspects of the disclosure.

FIG. 8 is an example representation of segments 1-5 each and a set of potential occluded pedestrians A-O at some point in the future with respect to the example of FIG. 6 corresponding to the time of FIG. 7 and the location of vehicle 100 in FIG. 9. In the example of FIG. 9, the vehicle 100 as well as vehicle 460 have moved closer to the crosswalk 440 and vehicle 470 has moved away from the crosswalk 440, enabling the sensors of the perception system 172 to perceive portions of the crosswalk 440. In this example, the sensor data from the perception system 172 may indicate that the areas of the crosswalk 440 corresponding to segments 1-3 may be detected or perceived by the perception system 172, and are therefore not occluded. In this regard, the potential occluded pedestrians D, B, C, E, G, F, H, and J (now shown in dashed-line) may be removed from the set of potential occluded pedestrians.

In some instances, potential occluded pedestrians may be removed from the sets because they may have left the crosswalk, for instance, by crossing one of the outer edges of the edge segments of the crosswalk. In addition, because the potential occluded pedestrians A and O (shown in dashed-line in FIGS. 7 and 8) are no longer located within a segment of the plurality of segments, these potential occluded pedestrians may also be removed from the set of potential occluded pedestrians.

Similarly, if the area around the edge of the crosswalk is occluded, new potential occluded pedestrians may be added to the sets as potential occluded pedestrians who have entered the crosswalks. Again, these pedestrians that enter the crosswalk may be given different speed characteristics as described above. Of course, if the outer edges of the crosswalk are not occluded new potential occluded pedestrians would not be added to the set.

Returning to FIG. 10, at block 1080, after the removing, the set is used to control the vehicle in the autonomous driving mode. As the segments (or rather, the areas of the segments of the crosswalk) become visible to the perception system and/or even occluded by other objects, the number of potential occluded pedestrians in the set may change, for instance, increasing as potential occluded pedestrians are added and decreasing as potential occluded pedestrians are removed. At the same time, after determining that the vehicle is approaching the crosswalk, the computing devices may also determine how to control the vehicle using the potential occluded pedestrians of the set. This may be done in any number of ways. As an example, each potential occluded pedestrian may be input into a planning system of the vehicle as an object to which the vehicle should respond.

Alternatively, rather than having the computing devices respond to a large number of potential occluded pedestrians, for each segment which is "occupied" by at least one potential occluded pedestrian, the computing devices may generate a speed constraint for the vehicle passing through the crosswalk. In one example, the speed constraint may be a limit on the speed of the vehicle that is determined based on a distance of the vehicle from the crosswalk to ensure that the vehicle is able to stop before reaching the crosswalk. In another example, the speed constraint may correspond to a slow region, for example, an area that has a limit on a maximum speed of the vehicle as it passes through or by the occupied segment or segments. In this regard, the planning system 168 must obey the speed constraint and/or maximum speed limit for the slow region when planning the vehicle's speed through the crosswalk. Returning to the example of FIG. 8, at this point in time, the computing devices 110 may generate a speed restriction with regard to the area of the crosswalk 440 corresponding to segments 4 and 5 corresponding to area 910. The area 920 may correspond to an area through which a volume of the vehicle 100 will sweep while approaching the area 910. In this regard, areas 910 and/or 920 of FIG. 9 may represent an area for a speed constraint or a slow region through which the vehicle 100 can travel at or below the maximum speed limit associated with the areas 910 and/or 920.

The speed constraint and/or slow region may be determined by the computing devices 110 based on the distance of an occupied segment to the vehicle as well as the speed of potential occluded pedestrians in the occupied segment. For example, the closer the locations or segments of the potential occluded pedestrians are to the vehicle, the lower the speed constraint or the lower the limit on the maximum speed). For example, if an occupied segment corresponds to an adjacent lane, the limit may be 5 mph or more or less. As another example, if an occupied segment corresponds to two lanes over, the limit may be 15 mph or more or less. Again, the speed constraint may also be based on a speed of the fastest potential occluded pedestrian of the set that occupies a segment. In other words, A pedestrian that is 2 lanes away from the vehicle and who is traveling at 12 mph, may create a much more dangerous situation as compared to a pedestrian in an adjacent lane who is stopped. In the faster potential occluded pedestrian case, the slow region may be slower than for the stopped potential occluded pedestrian even though the stopped potential occluded pedestrian is closer. At the same time, if a segment is occupied by 5 potential occluded pedestrians, the speed constraint or the limit on the maximum speed (and therefore the vehicle's response) would be the same as if 1 potential occluded pedestrian of the fastest speed towards the vehicle occupied the segment.

The planning system 168 may then use the slow region when generating a speed plan for a future trajectory of the vehicle 100. Because the tracking of potential occluded pedestrians may begin before or as soon as the vehicle is able to detect the crosswalk, the slow region may correspond to a location that actually allows the vehicle to stop. In other words, the distance between the vehicle and the slow region may be less than a current stopping distance for the vehicle given the vehicle's current speed and assuming a reasonable rate of deceleration. In this way, the slow region is not a "surprise" which results in the vehicle breaking uncomfortably hard. In some instances, a slow region may be violated, for instance, in an emergency situation where a vehicle behind the vehicle is approaching at a high rate of speed, etc.

The features described herein may enable the vehicle's computing devices to respond to potential occluded pedestrians who may be occluded while at the same time reducing the likelihood and necessity for abrupt maneuvers in the event that a pedestrian who was previously occluded appears and causes the vehicle to have to respond to that pedestrian. In addition, the processing described herein is not computationally intensive and can be easily recomputed when updates from sensor data are available.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling a vehicle having an autonomous driving mode, the method comprising:
   determining, by one or more processors, that the vehicle is approaching a crosswalk;
   generating, by the one or more processors, a set of potential occluded pedestrians for the crosswalk, each potential occluded pedestrian of the set of potential occluded pedestrians being assigned a speed characteristic defining a speed of the potential occluded pedestrian and an assigned location for the potential occluded pedestrian;
   updating the assigned location of the set of potential occluded pedestrians over time using the assigned speed characteristics;
   receiving, by the one or more processors, sensor data from a perception system of the vehicle corresponding to a visible area which is not occluded;
   removing, by the one or more processors, one or more potential occluded pedestrians from the set having an updated assigned location corresponding to the visible area; and
   after the removing, using, by the one or more processors, the set to control the vehicle in the autonomous driving mode.

2. The method of claim 1, wherein determining that the vehicle is approaching a crosswalk is based on a current route of the vehicle and map information identifying a location of the crosswalk.

3. The method of claim 1, wherein the generating is performed when the vehicle has reached a predetermined distance from the crosswalk.

4. The method of claim 3, wherein the predetermined distance corresponds to a distance along a current route of the vehicle.

5. The method of claim 3, wherein the predetermined distance corresponds to a distance between the vehicle and a forward edge of a field of view of a perception system of the vehicle including one or more sensors.

6. The method of claim 1, wherein generating the set of potential occluded pedestrians includes assigning a plurality of different speed characteristics to different ones of the set of potential occluded pedestrians.

7. The method of claim 6, wherein one of the plurality of different speed characteristics indicates that a pedestrian is stationary.

8. The method of claim 6, wherein one of the plurality of different speed characteristics includes a pedestrian moving in a first direction towards a first edge of the crosswalk at a first speed, and wherein another of the different speed characteristics includes a pedestrian moving in a second direction opposite of the first direction towards a second edge of the crosswalk opposite of the first edge at the first speed.

9. The method of claim 1, further comprising determining whether the one or more potential occluded pedestrians would have left the crosswalk, wherein the one or more potential occluded pedestrians are removed from the set of potential occluded pedestrians in response to determining that the one or more potential occluded pedestrians would have left the crosswalk.

10. The method of claim 1, further comprising:
    determining whether one or more edges of the crosswalk are occluded; and
    adding one or more additional potential occluded pedestrians to the set of potential occluded pedestrians based on the determination of whether one or more edges of the crosswalk are occluded, and wherein the removing is performed after the adding.

11. A system for controlling a vehicle having an autonomous driving mode, the system comprising:
    one or more processors configured to:
    determine that the vehicle is approaching a crosswalk;
    generate a set of potential occluded pedestrians for the crosswalk, each potential occluded pedestrian of the set of potential occluded pedestrians being assigned a speed characteristic defining a speed of the potential occluded pedestrian and an assigned location for the potential occluded pedestrian;
    update the assigned location of the set of potential occluded pedestrians over time using the assigned speed characteristics;
    receive sensor data from a perception system of the vehicle corresponding to a visible area which is not occluded;
    remove one or more potential occluded pedestrians from the set having an updated assigned location corresponding to the visible area; and
    after the removing, use the set to control the vehicle in the autonomous driving mode.

12. The system of claim 11, wherein the one or more processors are further configured to determine that the vehicle is approaching a crosswalk based on a current route of the vehicle and map information identifying a location of the crosswalk.

13. The system of claim 11, wherein the one or more processors are further configured to generate the set of potential occluded pedestrians when the vehicle has reached a predetermined distance from the crosswalk.

14. The system of claim 13, wherein the predetermined distance corresponds to a distance along a current route of the vehicle.

15. The system of claim 13, wherein the predetermined distance corresponds to a distance between the vehicle and a forward edge of a field of view of a perception system of the vehicle including one or more sensors.

16. The system of claim 11, wherein the one or more processors are further configured to generate the set of potential occluded pedestrians by assigning a plurality of different speed characteristics to different ones of the set of potential occluded pedestrians.

17. The system of claim 16, wherein one of the plurality of different speed characteristics indicates that a pedestrian is stationary.

18. The system of claim 16, wherein one of the plurality of different speed characteristics includes a pedestrian moving in a first direction towards a first edge of the crosswalk at a first speed, and wherein another of the different speed characteristics includes a pedestrian moving in a second direction opposite of the first direction towards a second edge of the crosswalk opposite of the first edge at the first speed.

19. The system of claim 11, wherein the one or more processors are further configured to:
    determine whether the one or more potential occluded pedestrians would have left the crosswalk; and
    remove the one or more potential occluded pedestrians from the set of potential occluded pedestrians based on the determination that the one or more potential occluded pedestrians would have left the crosswalk.

20. The system of claim 11, further comprising the vehicle.

* * * * *